(12) United States Patent
Miyata et al.

(10) Patent No.: US 6,196,523 B1
(45) Date of Patent: Mar. 6, 2001

(54) STOP VALVE

(75) Inventors: Kazuyuki Miyata; Koichi Kaminaga; Koji Miyazaki, all of Amagasaki (JP)

(73) Assignee: Kabushiki Kaisha Neriki (JP)

( * ) Notice: Subject to any disclaimer, the term of this patent is extended or adjusted under 35 U.S.C. 154(b) by 0 days.

(21) Appl. No.: 09/370,260

(22) Filed: Aug. 9, 1999

(30) Foreign Application Priority Data

Aug. 21, 1998 (JP) .................................................. 10-234807

(51) Int. Cl.$^7$ ........................... F16K 31/44; F16K 51/00; F16K 15/00
(52) U.S. Cl. .......................... 251/276; 251/264; 251/275; 251/277; 251/278; 251/285; 251/331
(58) Field of Search .................................... 251/264, 274, 251/275, 276, 277, 278, 285, 331

(56) References Cited

U.S. PATENT DOCUMENTS

| | | | |
|---|---|---|---|
| 1,031,932 | * 7/1912 | Hoare et al. | 251/275 |
| 2,118,300 | * 5/1938 | Ford | 251/278 |
| 3,529,805 | * 9/1970 | Callahan, Jr. et al. | 251/264 |
| 4,928,919 | 5/1990 | Daicho et al. | |
| 4,964,432 | * 10/1990 | Chou | 137/15 |

FOREIGN PATENT DOCUMENTS

| | | |
|---|---|---|
| 1 815 210 | 7/1969 | (DE). |
| 2 390 656 | 12/1978 | (FR). |
| 859958 | 1/1961 | (GB). |
| 02266169 | 10/1990 | (JP). |
| 08200539 | 8/1996 | (JP). |

* cited by examiner

Primary Examiner—Kevin Shaver
Assistant Examiner—D A Bonderer
(74) Attorney, Agent, or Firm—Bacon & Thomas PLLC (57) ABSTRACT

A housing (2) has an upper portion engaged with a cylindrical stopper member (20) in screw-thread fitting so as to be able to vertically advance and retract the stopper member (20). The stopper member (20) has an outer thread (20a) engaged with a nut member (21) and has an inner thread (20b) engaged with a thrust screw member (23) each in screw-thread fitting. The stopper member (20) has a stopping portion (A) which prevents the downward movement of the intermediate transmission member (25) connected to the thrust screw member (23) over a predetermined distance. This inhibits a metal diaphragm (12) from being excessively pushed to a valve seat (15). When further moving the diaphragm (12) for valve closing, the nut member (21) is loosened and at the same time the stopper member (20) is advanced downwards to thereby define a gap between a receiving portion (B) of the intermediate transmission member (25) and the stopping portion (A).

11 Claims, 8 Drawing Sheets

STOP VALVE

BACKGROUND OF THE INVENTION

1. Field of the Invention

The present invention relates to a manually opened and closed stop valve.

2. Description of the Related Art

The manually opened and closed stop valve of this type is adapted to bring a closure member into closing contact with a valve seat by a thrust of a thrust screw member, which results from advancing the thrust screw member to a housing through a tightening rotation of a handle.

However, when the handle is excessively tightened by mistake, the thrust screw member produces an overmuch thrust, which excessively pushes the closure member to the valve seat. This causes either or both of the valve seat and the closure member to make plastic deformation, which results in a likelihood of worsening the shut-off efficiency of the stop valve.

In order to prevent the foregoing excessive tightening, it is considered to prohibit the thrust screw member from further moving in a direction for valve closing over a predetermined distance, by a stopper fixed within the housing.

In this case, however, there are produced the following new problems.

For any reason, a foreign matter may bite into a space between the closure member and the valve seat. Or if the opening and closing operation is repeatedly conducted, it causes a sealing surface of the valve seat to wear off too much. In these cases, the closure member needs to be brought into closing contact with the valve seat more strongly.

However, as mentioned above, provided that the stopper prohibits the thrust screw member from further moving for valve closing over the predetermined distance, it is impossible to conduct further extra-tightening, which results in failing to satisfy the above-mentioned need.

SUMMARY OF THE INVENTION

The present invention has an object of making it possible to prevent the excessive tightening and at the same time readily conduct the extra-tightening.

In order to accomplish the object, the present invention includes a stop valve in the following manner, for example, as shown in each of FIGS. 1 to 6.

The stop valve is adapted to bring a closure member 12 into closing contact with a valve seat 15 by a thrust of an output portion 27 connected to a thrust screw member 23, which results from advancing the thrust screw member 23 to a housing 2 through a tightening rotation of a handle 26, wherein a stopper member 20 is provided between the housing 2 and a valve-closing thrust transmission system (T) which extends from the handle 26 to the output portion 27, the stopper member 20 being arranged so as to be able to be switched over to a stopping condition (X) which prevents the output portion 27 from further moving for valve closing over a predetermined distance and to a stop cancelling condition (Y) which allows the output portion 27 to further move for valve closing over the predetermined distance.

The present invention can result in the following function and effect.

While the stop valve is in normal use, the stopper member is switched over to the stopping condition. Thus even if the handle is excessively tightened by mistake, the stopper member can prevent the output portion of the valve-closing thrust transmission system from further moving for valve closing over the predetermined distance. This makes it possible to prohibit the closure member from being excessively pushed to the valve seat. As a result, either or both of the valve seat and the closure member can be prevented from making plastic deformation, which enables the stop valve to keep a good shut-off efficiency.

In the event that extra-tightening is required for any reason, the stopper member is switched over to the stop cancelling condition, thereby allowing the output portion to further move for valve closing over the predetermined distance. Therefore, extra-tightening of the handle can further advance the thrust screw member in a direction for valve closing. The thus resulting thrust of the thrust screw member causes the output portion to strongly move the closure member for valve closing. As a result, the closure member is brought into stronger closing contact with the valve seat. As such, the extra-tightening has been readily conducted only by switching over the stopper member from the stopping condition to the stop cancelling condition.

In consequence, it has become possible to prevent the excessive tightening and at the same time easily conduct the extra-tightening.

The present invention is preferably added with the following construction.

Figure 1:
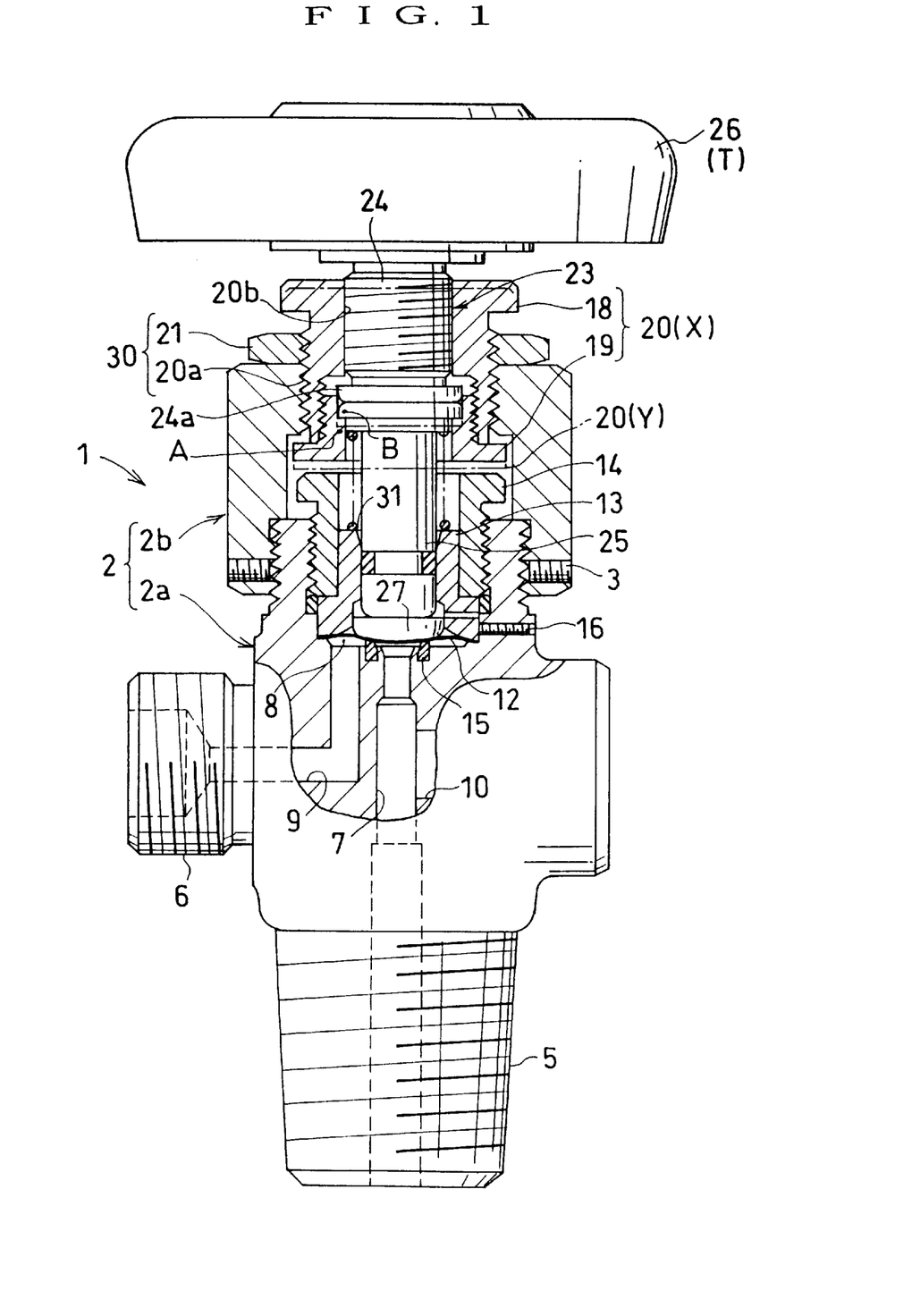
FIG. 1 shows a first embodiment of the present invention and is a partial sectional view illustrating a stop valve in elevation.
Figure 2:
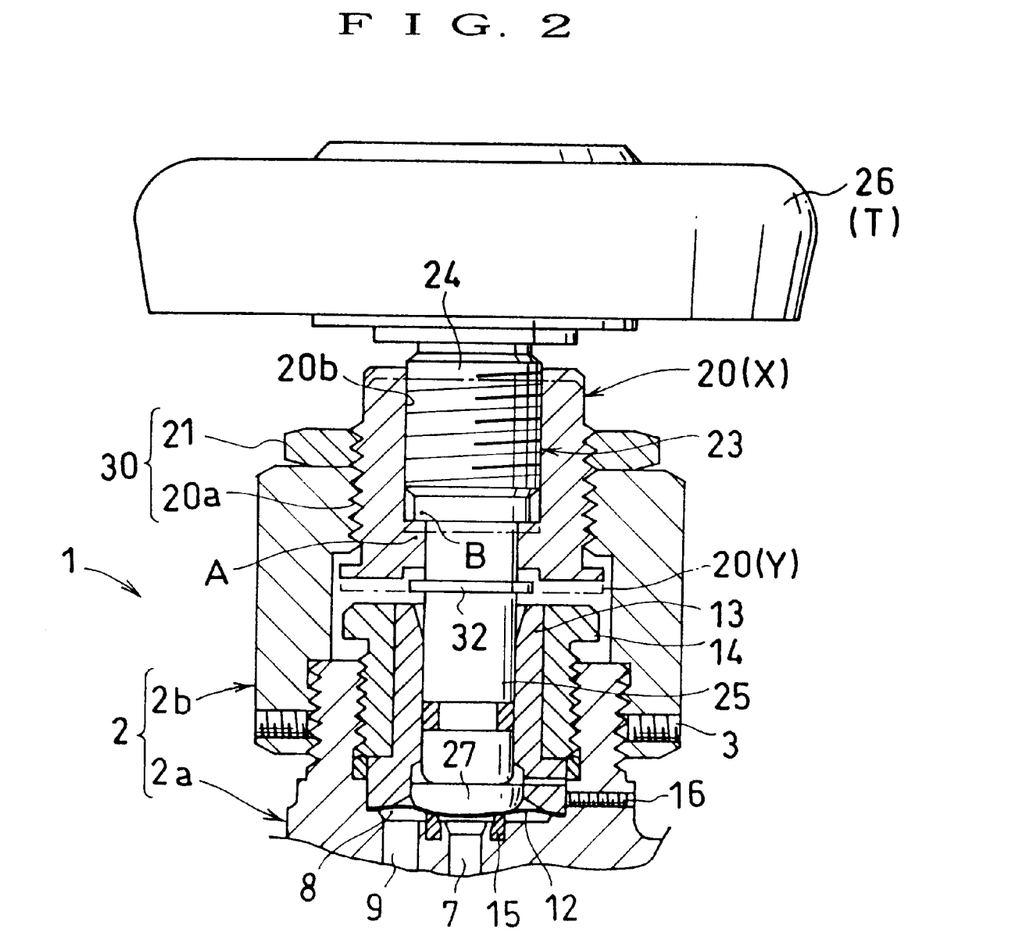
FIG. 2 shows a second embodiment of the present invention and is a partial view similar to FIG. 1.

For instance, as shown in FIGS. 1, and 2 there is provided between the thrust screw member 23 and the closure member 12, an intermediate transmission member 25 separate from the thrust screw member 23. The intermediate transmission member 25 has one end connected to the closure member 12 and has the other end provided with a receiving portion (B). The stopper member 20 is provided with a stopping portion (A) which axially faces the receiving portion (B).

According to the present invention, when rotating the handle for tightening purpose, relative rotation occurs around an axis mainly between the thrust screw member and the intermediate transmission member, but it can be inhibited from resulting around the axis between the intermediate transmission member and the closure member. This can inhibit members which exist between the receiving portion of the intermediate transmission member and the output portion from wearing off to axially shorten. As a result, it is possible to prevent the closure member from gradually reducing an amount of its movement for valve closing due to repeated opening and closing operation of the stop valve and therefore retain the amount of its movement for valve closing at a predetermined value over a prolonged period of time.

The present invention is preferably added with the concrete structure as further in the specification.

Figure 7:
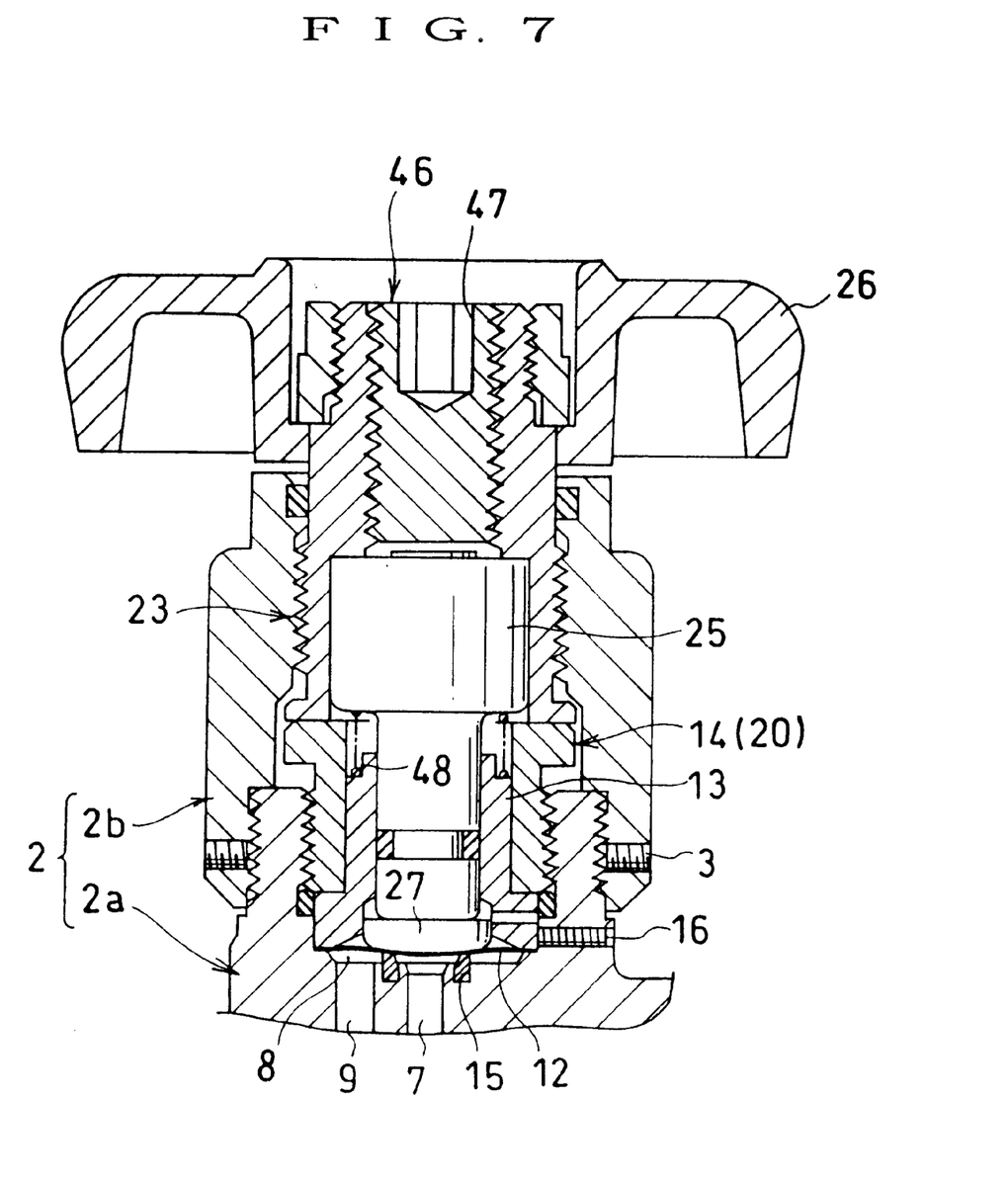
FIG. 7 shows a seventh embodiment of the present invention and is a view similar to FIG. 2.
Figure 8:
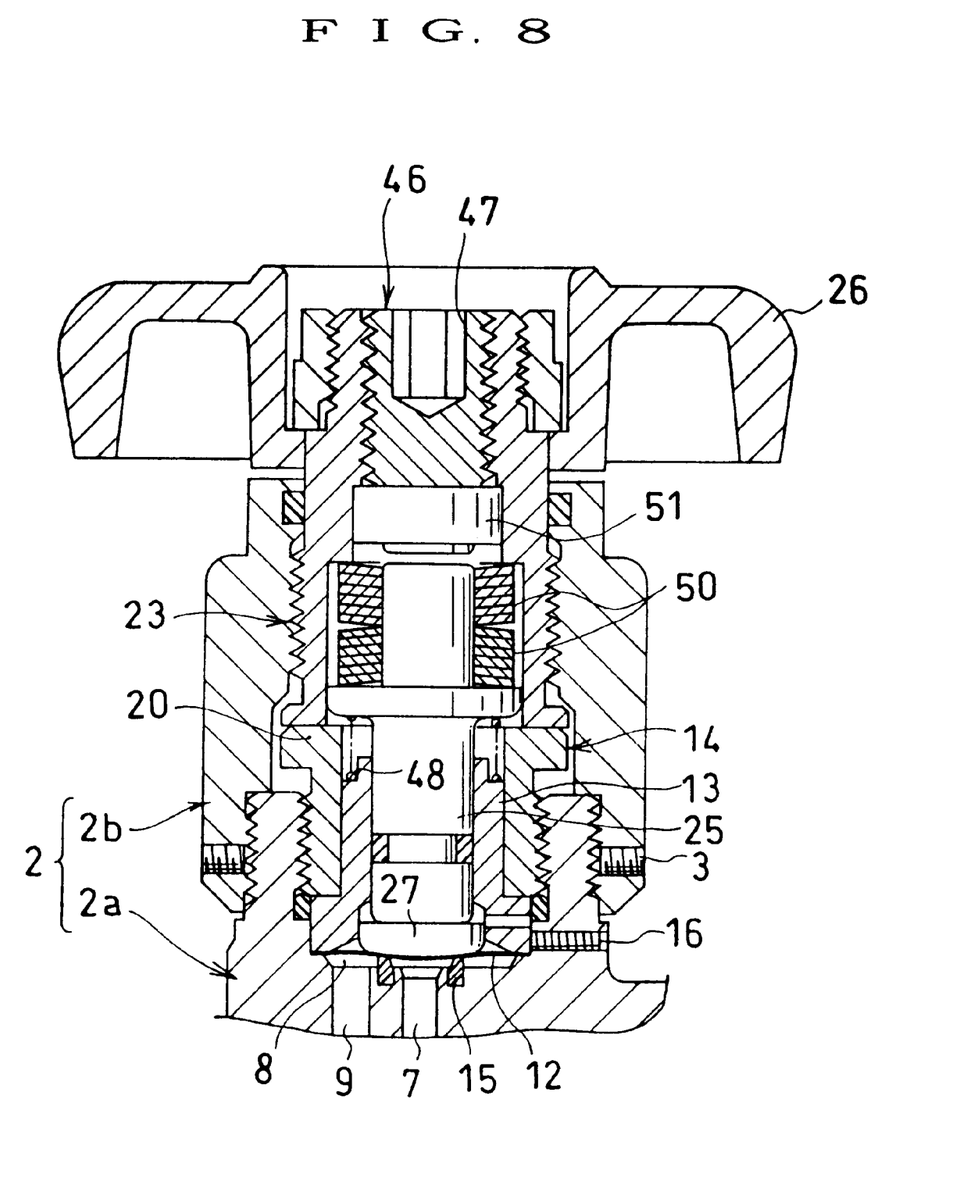
FIG. 8 shows an eighth embodiment of the present invention and is a view similar to FIG. 2.

Besides, in order to accomplish the above-mentioned object, the present invention includes a stop valve in the following manner, for example, as shown in FIG. 7 or FIG. 8.

The stop valve is adapted to bring a closure member 12 into closing contact with a valve seat 15 by a thrust of an output portion 27 connected to a thrust screw member 23, which results from advancing the thrust screw member 23 to a housing 2 through a tightening rotation of a handle 26, wherein an intermediate transmission member 25 is interposed between the thrust screw member 23 and the output portion 27, the intermediate transmission member 25 being supported by the thrust screw member 23 so as to be axially movable, and the housing 2 is provided with a stopper member 20 which prevents the thrust screw member 23 from further moving in a direction for valve closing over a predetermined distance, the thrust screw member 23 engaging with an extra-tightening bolt 46 in screw-thread fitting so as to be able to axially advance and retract the bolt 46, the extra-tightening bolt 46 having one end opposing to the intermediate transmission member 25 and having the other end provided with a rotation actuating portion 47.

The present invention can result in the following function and effect.

While the stop valve is in normal use, even if the handle is excessively tightened by mistake, the stopper member can prevent the thrust screw member from further moving for valve closing over the predetermined distance. This makes it possible to inhibit the excessive pushing of the closure member to the valve seat. As a result, either or both of the valve seat and the closure member can be prevented from making plastic deformation, which enables the stop valve to keep a good shut-off efficiency.

In the event that extra-tightening is required for any reason, the rotation actuating portion advances the extra-tightening bolt in the direction for valve closing. Then the thus resulting thrust of the extra-tightening bolt moves the intermediate transmission member in the direction for valve closing. Then the thus moved intermediate transmission member strongly moves the closure member for valve closing through the output portion. This enables the closure member to be brought into closing contact with the valve seat more strongly. As such the extra-tightening has been readily conducted only by operating the extra-tightening bolt.

In consequence, it has become possible to prevent the excessive tightening and at the same -time easily conduct the extra-tightening.

The present invention maybe added with concrete structure described in the description of the preferred embodiments.

BRIEF DESCRIPTION OF THE DRAWINGS

FIGS. 5(A) and 5(B) show a fifth embodiment of the present invention.

FIGS. 6(A) and 6(B) show a sixth embodiment of the present invention.

DESCRIPTION OF THE PREFERRED EMBODIMENTS

FIG. 1 shows a first embodiment and exemplifies a case where a stop valve according to the present invention is adapted to a gas cylinder valve 1. And it is a partial sectional view showing the gas cylinder valve 1 in elevation.

The gas cylinder valve 1 has a housing 2 comprising a lower housing portion 2a of a housing main body, and an upper housing portion 2b fitted onto an upper portion of the lower housing portion 2a in screw-thread engagement. The upper housing portion 2b is prevented from rotating by a plurality of hexagon socket head cap screws 3.

The lower housing portion 2a has a threaded leg 5 made connectable to a gas cylinder (not shown). The lower housing portion 2a has a mid-height portion which projects an outlet nozzle 6 horizontally. A gas take-out mouthpiece (not shown) is made connectable to the outlet nozzle 6. The threaded leg 5 has a bottom surface opened for providing an inlet passage 7 which communicates with an outlet passage 9 through a valve chamber 8. The inlet passage 7 has a midway portion from which a gas release passage 10 branches. The gas release passage 10 communicates with a safety valve (not shown). The safety valve is any one of rupture disk type, fusible plug type, combination type of the rupture disk and the fusible plug, and so on.

The valve chamber 8 has a metal diaphragm 12 of a closure member attached thereto. The metal diaphragm 12 has a peripheral edge portion hermetically fixed to a peripheral wall of the valve chamber 8 through a pushing sleeve 13 and a cylindrical bolt 14. And also the metal diaphragm 12 has a central portion facing a valve seat 15 made of synthetic resin from above.

Hexagon socket head cap small screw 16 is fitted into a leakage checking port. After having assembled the gas cylinder valve 1, it is checked whether or not gas present in a space below the metal diaphragm 12 leaks into the port through a space above the diaphragm 12. If not, thereafter, the small screw 16 airtightly seals the port as illustrated.

There is arranged a cylindrical stopper member 20 comprising an upper sleeve 18 and a lower sleeve 19 in an upper portion of the upper housing portion 2b. The stopper member 20 has an outer thread 20a engaged with the upper housing portion 2b in screw-thread fitting so as to be able to axially (here vertically) advance and retreat. A nut member 21 is fitted onto the outer thread 20a.

A thrust screw member 23 comprises an externally threaded rod 24 and an intermediate transmission member 25 vertically arranged one on another. The externally threaded rod 24 has a handle 26 detachably attached to its upper portion. The externally threaded rod 24 has at its lower portion a pushing portion 24a brought into contact with the metal diaphragm 12 through the intermediate transmission member 25 and an output portion 27 in order.

A raising spring 31 urges the intermediate transmission member 25 to the pushing portion 24a.

The output portion 27 is formed like a disk and as an independent part for absorbing rotation. This construction prohibits the transmission of a torque from the intermediate transmission member 25 to the metal diaphragm 12.

The externally threaded rod 24 engages with an inner thread 20b of the stopper member 20 in screw-thread fitting so as to be able to axially advance and retreat. In this embodiment, the inner thread 20b and the outer thread 20a of the stopper member 20 each comprises a right handed thread.

The stopper member 20 is provided at its lower sleeve 19 with a stopping portion (A) and the intermediate transmission member 25 is provided at its upper portion with a receiving portion (B). The stopping portion (A) opposes to the receiving portion (B) from below.

The gas cylinder valve 1 is adjusted, for example, according to the following procedures after having assembled the above-mentioned respective parts.

First, the stopper member 20 has been downwardly advanced to a provisional position near a location indicated by one dot chain line in FIG. 1.

Next, the handle 26 is rotated with a predetermined torque for tightening purpose to bring the metal diaphragm 12 into closing contact with the valve seat 15 by a predetermined thrust.

Subsequently, with the handle 26 and the thrust screw member 23 kept from rotating, the stopper member 20 is upwardly advanced to bring the stopping portion (A) into contact with the receiving portion (B). This can switch over the stopper member 20 to a stopping condition (X) designated by a full line in FIG. 1.

Finally, the nut member 21 is tightened with a predetermined torque to thereby fix the stopper member 20 to the upper housing portion 2b and hold it in the stopping condition (X). This completes the adjustment of the gas cylinder valve 1 after the assembling.

It is a matter of course that the adjustment after the assembling may be performed according to procedures different from the above-mentioned ones.

The gas cylinder valve 1 adjusted as above is used in the following way.

When taking gas out of the gas cylinder (not shown), the handle 26 is rotated in a loosening direction to thereby advance the thrust screw member 23 upwards. Then the metal diaphragm 12 separates from the valve seat 15 thanks to its own resilience restoring force and a pressure acting through the inlet passage 7. This takes the gas in the gas cylinder out to an exterior area through the inlet passage 7, the valve chamber 8 and the outlet passage 9 in order.

Conversely, when stopping the gas take-out, the handle 26 is rotated in a tightening direction to downwardly advance the thrust screw member 23. Then the intermediate transmission member 25 and the output portion 27 are pushed downward. The thus resulting downward thrust pushes the metal diaphragm 12 toward the valve seat 15. More specifically, the handle 26, the thrust screw member 23, the intermediate transmission member 25 and the output portion 27 compose a valve-closing thrust transmission system (T).

And when the thrust screw member 23 is further lowered to bring the receiving portion (B) into contact with the stopping portion (A), the thrust screw member 23, the intermediate transmission member 25 and the output portion 27 are prevented from descending to thereby stop the movement of the metal diaphragm 12 for valve closing.

Should it become necessary for any reason to move the metal diaphragm 12 further downwards for valve closing, extra-tightening is performed according to the following procedures.

First, the nut member 21 is loosened and the stopper member 20 is downwardly advanced to the location indicated by one dot chain line in FIG. 1, thereby switching over the stopper member 20 to a stop cancelling condition (Y). More specifically, the outer thread 20a of the stopper member 20 and the nut member 21 compose a switching device 30 for switching over the stopper member 20 to the stopping condition (X) and to the stop cancelling condition (Y).

In the stop cancelling condition (Y), the stopping portion (A) of the stopper member 20 and the receiving portion (B) defines a vertically extending gap therebetween. Therefore, the tightening rotation of the handle 26 allows the thrust screw member 23 and the intermediate transmission member 25 to descend. The thus descended intermediate transmission member 25 lowers the output portion 27, thereby further moving the metal diaphragm 12 for valve closing.

The foregoing first embodiment produces the following advantages.

The metal diaphragm 12 composes the closure member to result in reducing a dead space within the valve chamber 8 and besides a gas contact area of the valve chamber 8. Consequently, it is particularly preferable when handling gas of ultra-high purity for semiconductors or the like. Additionally, the valve seat 15 is formed from synthetic resin and is made to have a small pore size. Thus only a light operational force can operate the metal diaphragm 12 for valve closing.

The output portion 27 is preferably formed for an independent part as exemplified, but it may be formed integrally with the intermediate transmission member 25.

FIG. 2 to FIG. 8 show a second to an eighth embodiments, respectively. In these other embodiments, the members of the same constructions as those of the first embodiment are, in principle, designated by the same characters. Therefore, hereafter explanation is given for constructions different from those of the first embodiment.

In a second embodiment of FIG. 2, the intermediate transmission member 25 is formed integrally with the thrust screw member 23. The externally threaded rod 24 of the thrust screw member 23 has a lower portion provided with the receiving portion (B).

The intermediate transmission member 25 has an upward portion attached to a snap ring 32 in fitting manner, which prevents its removal.

Figure 3:
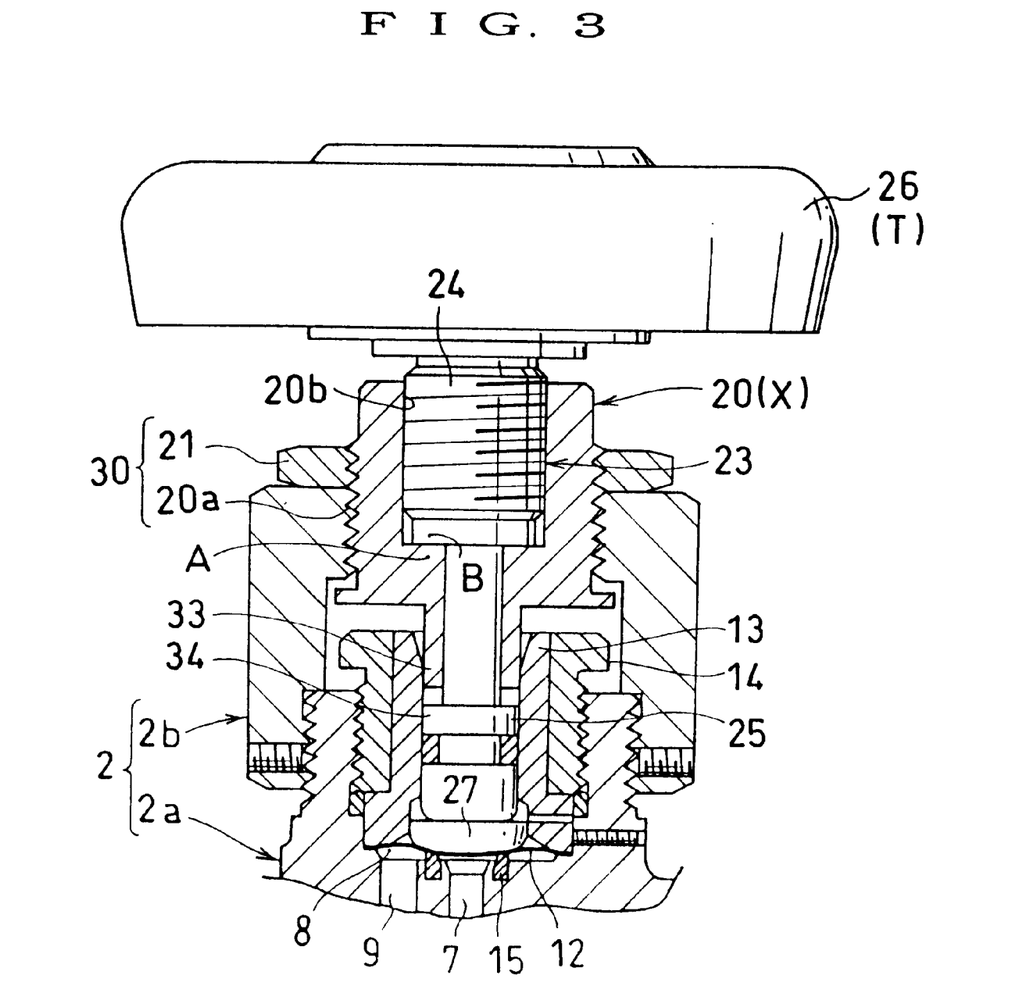
FIG. 3 shows a third embodiment of the present invention and is a view similar to FIG. 2.

In a third embodiment of FIG. 3, the cylindrical stopper member 20 has a lower portion which projects an extra-tightening output portion 33 and the intermediate transmission member 25 has a mid-height portion provided with an extra-tightening input portion 34. The input portion 34 opposes to the output portion 33 at a predetermined spacing.

When the nut member 21 is loosened to downwardly advance the stopper member 20, the stopping portion (A) separates from the receiving portion (B) to cancel the stopping condition (X) of the stopper member 20. At the same time, the extra-tightening output portion 33 pushes the input portion 34 downwards, thereby causing the output portion 27 to further move the metal diaphragm 12 for valve closing.

Figure 4:
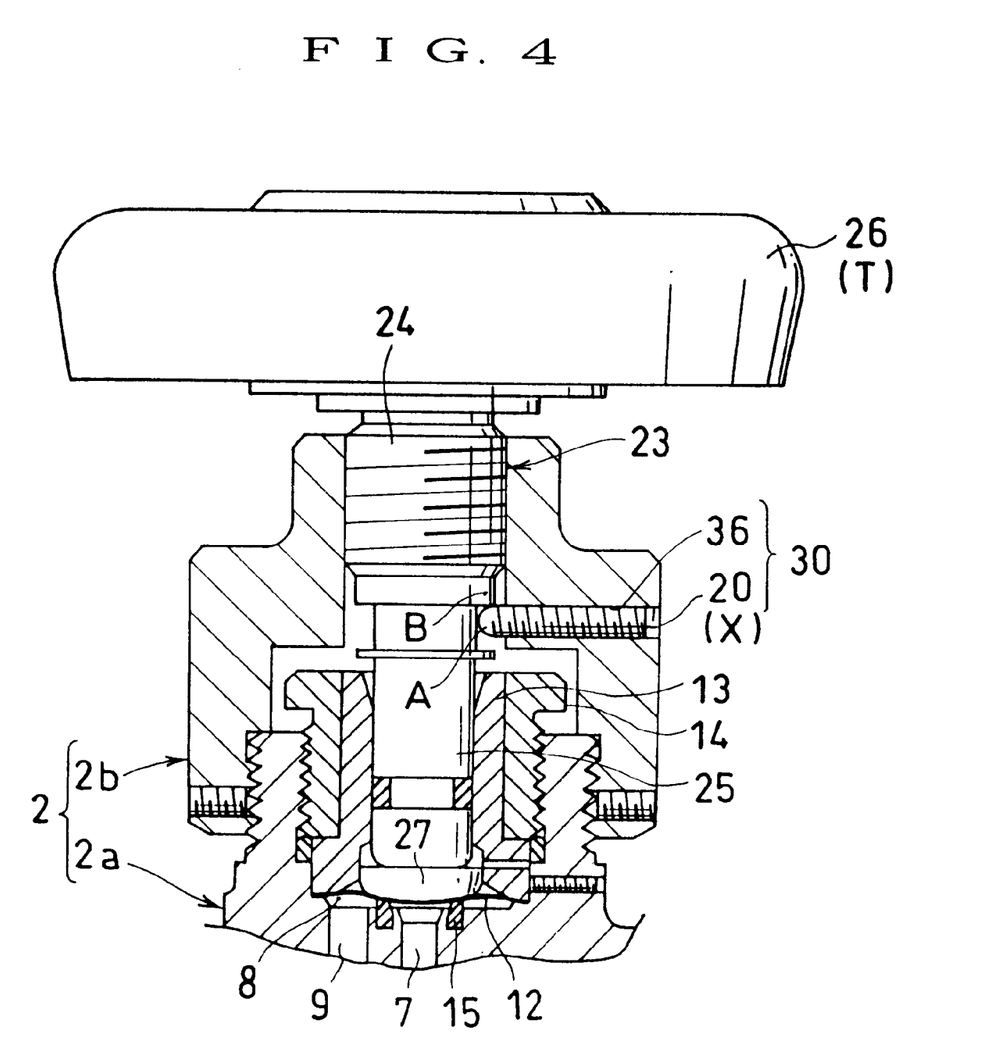
FIG. 4 shows a fourth embodiment of the present invention and is a view similar to FIG. 2.

In a fourth embodiment of FIG. 4, the upper housing portion 2b has an internally threaded hole 36 formed horizontally thereof, into which a bolt-like stopper member 20 is fitted in screw-thread engagement. The stopper member 20 is adapted so that it can be switched over to the stopping condition (X) where it protrudes toward an axis of the externally threaded rod 24 of the thrust screw member 23 and to the stop cancelling condition where it retreats from the axis. More specifically, the stopper member 20 is fitted into the internally threaded hole 36 in screw-thread engagement mechanism to thereby compose the switching-over device 30.

Through switching over the stopper member 20 to the leftward stopping condition (X) as illustrated, the stopping portion (A) at a leading end of the stopper member 20 opposes to the receiving portion (B) at the lower portion of the externally threaded rod 24 from below to thereby inhibit the descent of the thrust screw member 23 and the output portion 27.

And when advancing the stopper member 20 rightwards to thereby switch it over to the stop cancelling condition, extra-tightening of the handle 26 allows the thrust screw member 23 and the output portion 27 to descend.

The intermediate transmission member 25 may be formed separately from the thrust screw member 23 instead of being integrally formed therewith. In this case, the separately formed intermediate transmission member 25 preferably has the receiving portion (B) provided at its upper portion.

Figure 5A:
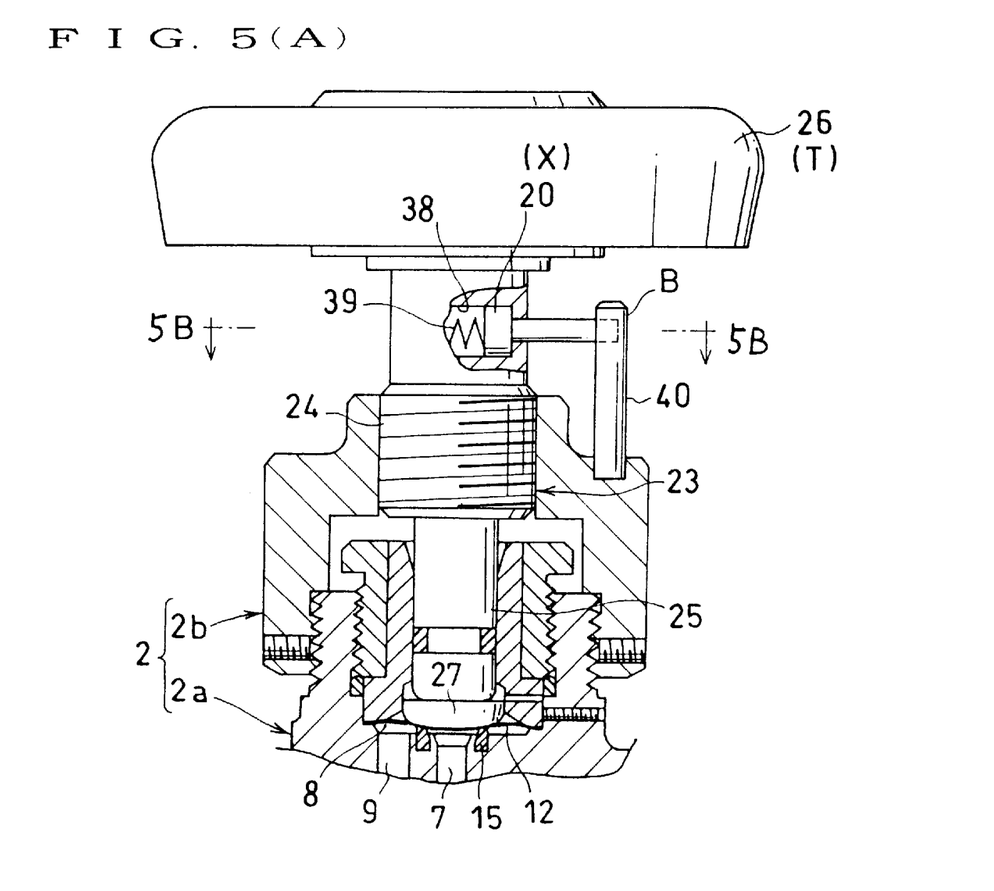
FIG. 5(A) is a view similar to FIG. 2.
Figure 5B:
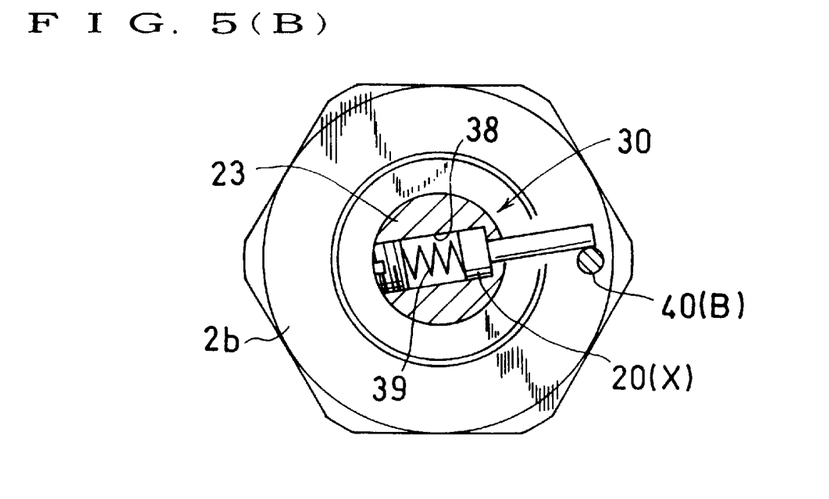
FIG. 5(B) is a sectional view when seen along a line 5B—5B in a direction indicated by arrows in FIG. 5(A)

In a fifth embodiment of FIGS. 5(A) and 5(B), the thrust screw member 23 has an upper portion provided with a guide hole 38 extending in a radial direction. The guide hole 38 has a piston-like stopper member 20 fitted thereinto. An advancing spring 39 projects the piston-like stopper member 20.

The stopper member 20 protrudes outward in the radial direction in the illustrated stopping condition (X) to be received by a pin 40 (receiving portion (B)) fixed to the upper housing portion 2b. This prevents the tightening rotation of the handle 26 and the thrust screw member 23, which in turn inhibits the descent of the thrust screw member 23 and the output portion 27.

And when the stopper member 20 retreats into the guide hole 38 against the advancing spring 39, it is switched over to the stop cancelling condition. This enables the handle 26 to perform the extra-tightening, thereby further moving the thrust screw member 23 and the output portion 27 downwards.

More specifically, the guide hole 38, the piston-like stopper member 20, the advancing spring 39 and the pin 40 compose the switching-over means 30.

Figure 6A:
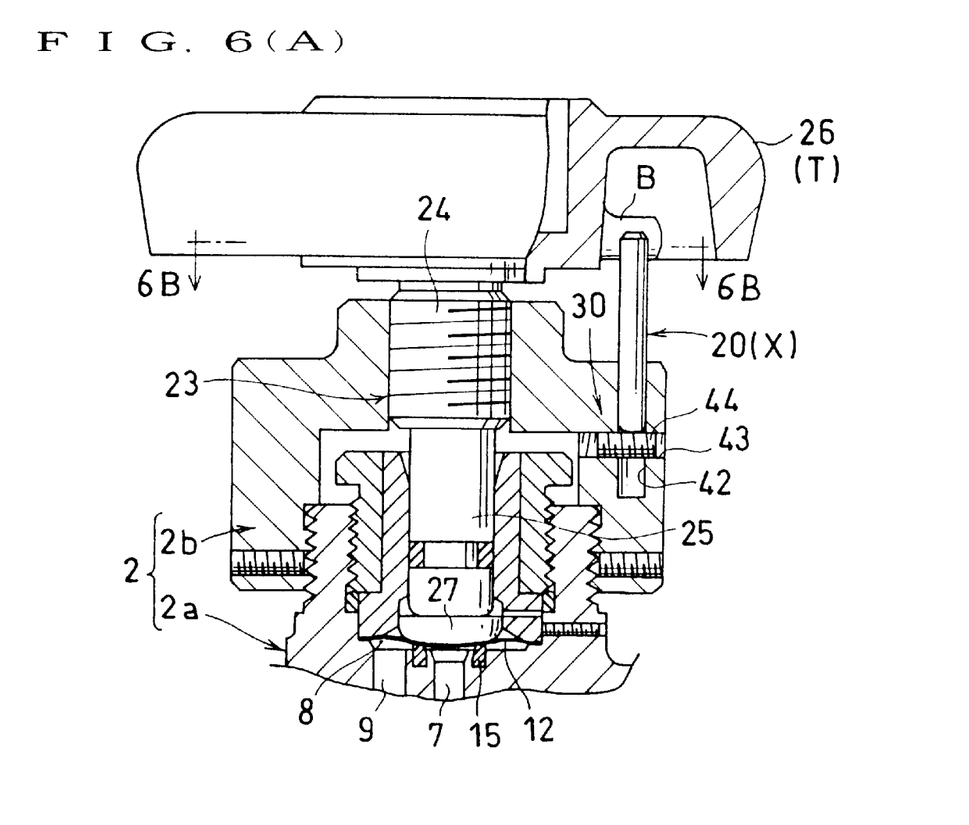
FIG. 6(A) is a view similar to FIG. 2.
Figure 6B:
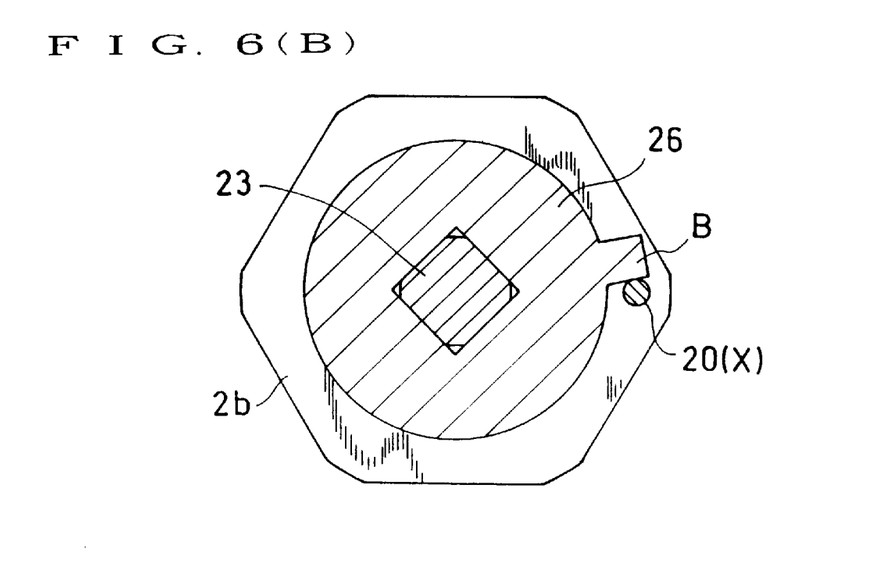
FIG. 6(B) is a sectional view when seen along a line 6B—6B in a direction indicated by arrows in FIG. 6(A)

In a sixth embodiment of FIGS. 6(A) and 6(B), the upper housing portion 2b is provided with a vertically extending guide hole 42. The guide hole 42 crosses an internally threaded hole 43, into which a change-over bolt 44 is fitted in screw-thread engagement. The guide hole 42 has an upper half portion into which a pin-like stopper member 20 is inserted.

Through holding the stopper member 20 in the illustrated stopping condition (X) where it protrudes upwards, the receiving portion (B) provided in the handle 26 is brought into contact with the stopper member 20 to thereby prevent the tightening rotation of the handle 26 and the thrust screw member 23, which in turn inhibits the descent of the thrust screw member 23 and the output portion 27.

Then the change-over bolt 44 is advanced in either of a left and a right directions to thereby switch over the stopper member 20 to the stop cancelling condition where it is lowered. Thus the handle 26 can conduct the extra-tightening, thereby making it possible to further lower the thrust screw member 23 and the output portion 27.

More specifically, the guide hole 42, the internally threaded hole 43 and the change-over bolt 44 compose the switching-over device 30.

In a seventh embodiment of FIG. 7, the intermediate transmission member 25 is formed separately from the thrust screw member 23 and is supported by the thrust screw member 23 so as to be axially movable. The cylindrical bolt 14 fixed to the lower housing portion 2a composes the stopper member 20 which prevents the thrust screw member 23 from downwardly moving in a direction for valve closing over a predetermined distance. Further, the thrust screw member 23 has an upper portion engaged with an extra-tightening bolt 46 in screw-thread fitting so as to be able to axially advance and retract the bolt 46. The bolt 46 has a lower end directly facing an upper portion of the intermediate transmission member 25 and has an upper end provided with a rotation actuating portion 47. A raising spring 48 urges the intermediate transmission member 25 upwards.

And in the case of further moving the metal diaphragm 12 for valve closing from the illustrated stopping condition, a hexagon wrench or the like operating member (not shown) attached to the rotation actuating portion 47 downwardly and strongly advances the extra-tightening bolt 46. Then the bolt 46 downwardly pushes the metal diaphragm 12 through the intermediate transmission member 25 and the output portion 27 to bring the metal diaphragm 12 into closing contact with the valve seat 15 strongly.

The intermediate transmission member 25 may be integrally formed with the output portion 27.

An eighth embodiment of FIG. 8 is created by mounting a plurality of coned disk springs 50 superimposed in a layered fashion between the thrust screw member 23 and the intermediate transmission member 25 in the seventh embodiment of FIG. 7. The resilient repulsion force of the coned disk springs 50 always urges the metal diaphragm 12 in the direction for valve closing, so that it is possible to surely prevent the leakage while the gas cylinder is being stored.

Although another intermediate transmission member 51 is interposed between the intermediate transmission member 25 and the extra-tightening bolt 46, it may be omitted.

The foregoing respective embodiments can be modified as follows.

The closure member of the present invention may be a valve member of another type such as poppet type instead of the illustrated metal diaphragm 12. In this event, there are considered two cases. In one case, the closure member of the poppet type is directly closed by the thrust screw member 23 or the intermediate transmission member 25. In the other case, it is closed through an airtightness keeping diaphragm which airtightly partitions the valve chamber. In the latter case, the airtightness keeping diaphragm composes the output portion of the valve-closing thrust transmission system (T).

The valve seat 15 may be formed from a metal instead of the exemplified synthetic resin.

The housing may comprise at least three housing portions instead of the illustrated two housing portions 2a, 2b. Further, the housing 2 may have an integral structure.

The handle 26 may have other shapes such as a lever shape instead of the illustrated wheel shape.

The stop valve to which the present invention is applied may be a valve arranged at a midway portion of a piping system instead of the illustrated gas cylinder valve 1.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A stop valve adapted to bring a closure member (12) into closing contact with a valve seat (15) by a thrust of an output portion (27) connected to a thrust screw member (23), which results from advancing the thrust screw member (23)

to a housing (2) through a tightening rotation of a handle (26), the stop valve comprising:

a stopper member (20) provided between the housing (2) and a valve-closing thrust transmission system (T) which extends from the handle (26) to the output portion (27); and a switching-over device (30) for switching over the stopper member (20) to a stopping condition (X) which prevents the output portion (27) from further moving for valve closing over a predetermined distance and to a stop cancelling condition (Y) which allows the output portion (27) to further move for valve closing over the predetermined distance.

2. The stop valve as set forth in claim 1, wherein there is provided between the thrust screw member (23) and the closure member (12), an intermediate transmission member (25) separate from the thrust screw member (23), the intermediate transmission member (25) having a first end and a second end, the first end being connected to the closure member (12) and the second end being provided with a receiving portion (B), and the stopper member (20) has a stopping portion (A) which axially faces the receiving portion (B).

3. The stop valve as set forth in claim 2, wherein the stopper member (20) has an outer thread (20a) and an inner thread (20b) and is made cylindrical, the outer thread (20a) being engaged with the housing (2) in screw-thread fitting so as to be able to axially advance and retreat and the inner thread (20b) being engaged with the thrust screw member (23) in screw-thread fitting.

4. The stop valve as set forth in claim 1, wherein the stopper member (20) has an outer thread (20a) and an inner thread (20b) and is made cylindrical, the outer thread (20a) being engaged with the housing (2) in screw-thread fitting so as to be able to axially advance and retreat and the inner thread (20b) being engaged with the thrust screw member (23) in screw-thread fitting.

5. The stop valve as set forth in claim 4, wherein the switching-over device (30) comprises the outer thread (20a) of the stopper member (20) and a nut member (21) engaged with the outer thread (20a) in screw-thread fitting.

6. The stop valve as set forth in claim 5, wherein the cylindrical stopper member (20) is provided with an extra-tightening output portion (33) and the thrust screw member (23) is provided with an extra-tightening input portion (34), the output portion (33) axially opposing to the input portion (34).

7. The stop valve as set forth in claim 4, wherein the cylindrical stopper member (20) is provided with an extra-tightening output portion (33) and the thrust screw member (23) is provided with an extra-tightening input portion (34), the output portion (33) axially opposing to the input portion (34).

8. The stop valve as set forth in claim 1, wherein the thrust screw member (23) has an axis and the stopper member (20) is supported by the housing (2) so as to be able to be switched over to the stopping condition (X) where the stopper member (20) protrudes toward the axis and to the stop cancelling condition where it retreats from the axis.

9. The stop valve as set forth in claim 1, wherein the stopper member (20) is supported by the thrust screw member (23) so as to be movable to the stopping condition (X) where the stopper member (20) protrudes outwardly of the thrust screw member (23) in a radial direction and to the stop cancelling condition where it retreats inwardly in the radial direction, the housing (2) being provided with a receiving portion (B) which opposes to the stopper member (20) in the stopping condition (X).

10. The stop valve as set forth in claim 1, wherein the stopper member (20) is supported by the housing (2) so as to be movable to the stopping condition (X) where the stopper member (20) protrudes from the housing (2) toward the handle (26) and to the stop cancelling condition where it retreats from the handle (26), the handle (26) being provided with a receiving portion (B) which opposes to the stopper member (20) in the stopping condition (X).

11. The stop valve as set forth in claim 1, wherein the closure member (12) is formed from a metal diaphragm and the valve seat (15) is made of synthetic resin.

* * * * *